No. 717,278. Patented Dec. 30, 1902.
P. RIESS & C. LANGE.
GAS SAVING ATTACHMENT.
(Application filed Aug. 5, 1902.)
(No Model.)
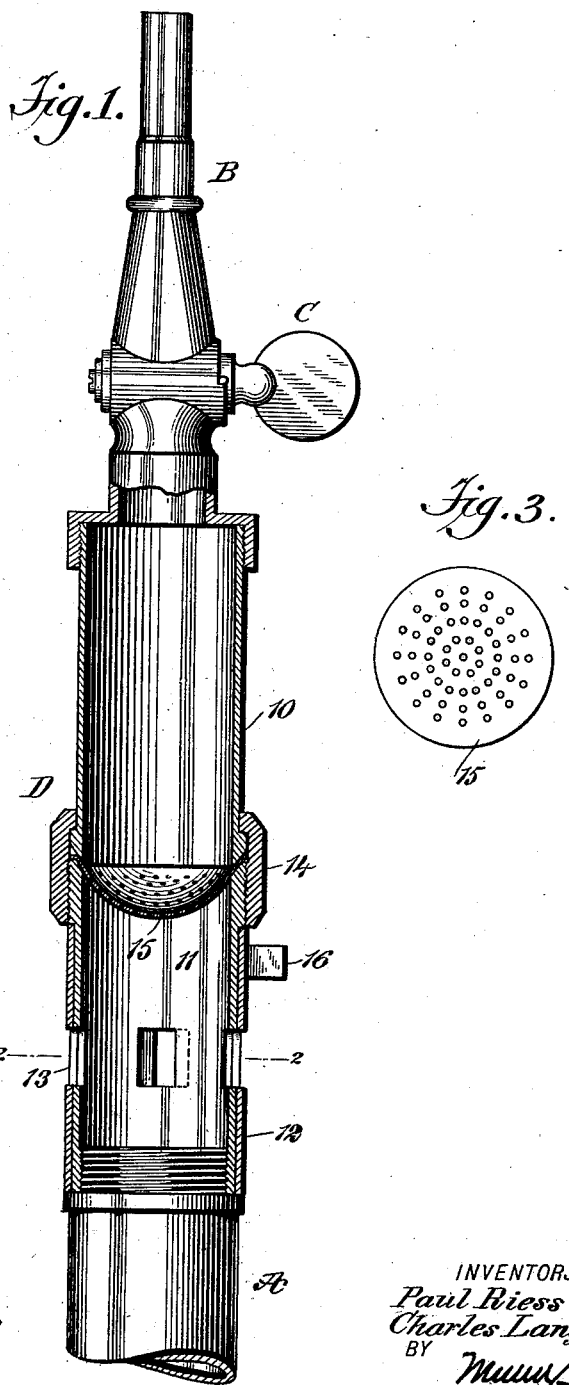
WITNESSES:
INVENTORS
Paul Riess
Charles Lange
BY
ATTORNEYS.

UNITED STATES PATENT OFFICE.

PAUL RIESS AND CHARLES LANGE, OF NEW ORLEANS, LOUISIANA.

GAS-SAVING ATTACHMENT.

SPECIFICATION forming part of Letters Patent No. 717,278, dated December 30, 1902.

Application filed August 5, 1902. Serial No. 118,477. (No model.)

*To all whom it may concern:*

Be it known that we, PAUL RIESS and CHARLES LANGE, citizens of the United States, and residents of the city of New Orleans, in the parish of Orleans and State of Louisiana, have invented a new and Improved Gas-Saving Attachment, of which the following is a full, clear, and exact description.

The purpose of our invention is to provide a device adapted for use in any system of piping, whereby to economize in the use of gas for heating, lighting, and cooking purposes, and to so construct the device that it may be readily and conveniently applied at a burner or at any point in the system of piping between the meter and the points where the gas is to be consumed.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1 is a sectional side elevation of the device shown applied to a burner. Fig. 2 is a horizontal section taken practically on the line 2 2 in Fig. 1, and Fig. 3 is a plan view of the gas-check employed.

A represents a section of a gas-pipe connected with a properly-regulated source of gas-supply, and B an ordinary gas-burner having the customary barrel-cock C, and D represents the improved device interposed between the service-pipe A and the burner B.

The body portion of the device consists of an upper single tube 10, threaded to receive the burner or fitted for attachment to a gas-conducting pipe or tube, and two regulating-tubes 11 and 12, mounted to turn one on the other. Both of these regulating-tubes between their ends are provided with a series of circumferentially-arranged openings 13, adapted to register in one position of the regulating-tubes, or said regulating-tubes 11 and 12 may be operated to partially or completely close the openings 13, as is shown in Fig. 2. The inner regulating-tube 11 is stationary and has a threaded or other suitable connection with the supply-pipe A at one end and practically abuts the single tube 10 at its opposite end, being connected with said single tube, preferably by means of a union-coupling 14, as is shown in Fig. 1. Within the union-coupling 14 a gas-check 15 is located. This gas-check is convexed on one surface and concaved on the opposite surface, being of dished formation, and is perforated or reticulated, as may be preferred. The marginal portion of the gas-check 15 is located between the opposing ends of the inner regulating-tube 11 and the single tube 10 of the body of the device, as is shown in Fig. 1, and the convexed surface of the said gas-check extends into the inner regulating-tube 11, while the concaved surface of the gas-check faces the single body-tube 10.

The outer regulating-tube 12 is mounted to turn loosely on the inner regulating-tube 11 and is provided with a suitable handle 16, whereby to readily operate the said outer regulating-tube.

In the operation of the device air is admitted in suitable quantities thereto through the openings 13 in the body, and the air and gas mingled therewith supplied to the body is prevented from rushing to the burner or point to be burned with undue rapidity by the interposition of the aforesaid gas-check 15, which serves to regulate the pressure of gas.

We desire it to be understood that in practice the check 15 may have three, six, nine, twelve, twenty-four, or fifty-six openings to constitute a set of checks which will enable the user by removing one check and substituting another to regulate the pressure of gas as desired.

Having thus described our invention, we claim as new and desire to secure by Letters Patent—

A device of the class described, comprising an upper single tube, and two lower regulating-tubes, one of said lower regulating-tubes incasing the other, the said tubes having slots therein adapted to register when the outer tube is rotated relatively to the inner tube, the upper edge of the inner stationary regulating-tube being enlarged and arranged adjacent to the similarly-enlarged lower end of the single tube, a perforated concaved gas-retarding plate held between the adjoining edges of the stationary tube and the upper single tube, and a union-coupling connecting the two enlarged portions of the aforesaid tubes, substantially as set forth.

In testimony whereof we have signed our names to this specification in the presence of two subscribing witnesses.

PAUL RIESS.
CHARLES LANGE.

Witnesses:
H. L. LOOMIS, Jr.,
FRED. ZENGEL.